US008341687B2

(12) United States Patent
Blackketter et al.

(10) Patent No.: US 8,341,687 B2
(45) Date of Patent: *Dec. 25, 2012

(54) COMMUNICATING SCRIPTS IN A DATA SERVICE CHANNEL OF A VIDEO SIGNAL

(75) Inventors: Dean J. Blackketter, San Francisco, CA (US); Daniel J. Zigmond, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 1811 days.

This patent is subject to a terminal disclaimer.

(21) Appl. No.: 11/093,666

(22) Filed: Mar. 30, 2005

(65) Prior Publication Data
US 2005/0172331 A1 Aug. 4, 2005

Related U.S. Application Data

(63) Continuation of application No. 09/287,985, filed on Apr. 7, 1999, now Pat. No. 6,938,270.

(51) Int. Cl.
*H04N 7/16* (2006.01)
*H04N 7/025* (2006.01)
*H04N 7/173* (2006.01)
*H04N 7/00* (2006.01)

(52) U.S. Cl. .............. 725/135; 725/34; 725/43; 725/51; 725/112; 348/461; 348/563

(58) Field of Classification Search ................. None
See application file for complete search history.

(56) References Cited

U.S. PATENT DOCUMENTS

| 4,894,789 A | 1/1990 | Yee |
| 5,010,499 A | 4/1991 | Yee |
| 5,091,877 A | 2/1992 | Itoh |
| 5,121,476 A | 6/1992 | Yee |
| 5,355,484 A | 10/1994 | Record |
| 5,473,673 A | 12/1995 | Van Wijk |

(Continued)

FOREIGN PATENT DOCUMENTS

EP 0849946 6/1998

(Continued)

OTHER PUBLICATIONS

"Advanced Television Enhancement Forum Specification (ATVEF)" Copyright © ATVEF Draft, Version 1.1r26, updated Feb. 2, 1999 pp. 1-37.*

(Continued)

*Primary Examiner* — Kristine Kincaid
*Assistant Examiner* — James Marandi
(74) *Attorney, Agent, or Firm* — Workman Nydegger

(57) ABSTRACT

Described are methods and apparatus for enhancing an information resource, such as a Web page, simultaneously residing in memory on a number of remote receivers. A content creator, (e.g., a program producer, broadcaster, affiliate, cable company or satellite provider), embeds a trigger in a data service channel of a broadcast signal. The trigger includes a resource identifier unique to the information resource and a script capable of modifying the information resource. The script might be a script or a segment of a script written in a conventional scripting language. Each receiver that includes the targeted information resource monitors the data service channel of the broadcast video signal for script-bearing triggers directed to that resource. If a receiver receives a script-bearing trigger directed to the resident resource, the receiver executes the script contained within the trigger to alter the resource and/or the displayed video defined by the resource.

20 Claims, 6 Drawing Sheets

U.S. PATENT DOCUMENTS

| | | | |
|---|---|---|---|
| 5,485,553 A | 1/1996 | Kovalick | |
| 5,488,409 A | 1/1996 | Yuen | |
| 5,508,731 A | 4/1996 | Kohorn | |
| 5,526,035 A * | 6/1996 | Lappington et al. | 725/136 |
| 5,528,490 A | 6/1996 | Hill | |
| 5,539,822 A | 7/1996 | Lett | |
| 5,565,895 A | 10/1996 | Akatsuka | |
| 5,589,892 A | 12/1996 | Knee | |
| 5,600,632 A | 2/1997 | Schulman | |
| 5,617,526 A | 4/1997 | Oran | |
| 5,648,824 A | 7/1997 | Dunn | |
| 5,737,552 A | 4/1998 | Lavallee | |
| 5,752,159 A | 5/1998 | Faust | |
| 5,761,602 A | 6/1998 | Wagner | |
| 5,761,606 A | 6/1998 | Wolzien | |
| 5,771,354 A | 6/1998 | Crawford | |
| 5,774,664 A | 6/1998 | Hidary | |
| 5,774,666 A * | 6/1998 | Portuesi | 725/110 |
| 5,778,181 A * | 7/1998 | Hidary et al. | 725/110 |
| 5,796,967 A | 8/1998 | Filepp | |
| 5,798,785 A | 8/1998 | Hendricks | |
| 5,801,747 A | 9/1998 | Bedard | |
| 5,818,441 A * | 10/1998 | Throckmorton et al. | 715/717 |
| 5,818,935 A | 10/1998 | Maa | |
| 5,826,165 A | 10/1998 | Echeita | |
| 5,832,223 A * | 11/1998 | Hara et al. | 725/114 |
| 5,835,712 A | 11/1998 | DuFresne | |
| 5,838,314 A | 11/1998 | Neel | |
| 5,844,620 A | 12/1998 | Coleman | |
| 5,845,260 A | 12/1998 | Nakano | |
| 5,848,352 A | 12/1998 | Dougherty | |
| 5,848,396 A | 12/1998 | Gerace | |
| 5,848,397 A | 12/1998 | Marsh | |
| 5,855,008 A | 12/1998 | Goldhaber | |
| 5,857,190 A | 1/1999 | Brown | |
| 5,861,881 A | 1/1999 | Freeman | |
| 5,862,220 A | 1/1999 | Perlman | |
| 5,864,823 A | 1/1999 | Levitan | |
| 5,867,208 A | 2/1999 | McLaren | |
| 5,889,950 A | 3/1999 | Kuzma | |
| 5,929,849 A | 7/1999 | Kikinis | |
| 5,929,850 A | 7/1999 | Broadwin | |
| 5,931,908 A | 8/1999 | Gerba | |
| 5,937,331 A | 8/1999 | Kalluri | |
| 5,940,073 A | 8/1999 | Klosterman | |
| 5,956,090 A | 9/1999 | Yamauchi | |
| 5,961,603 A | 10/1999 | Kunkel | |
| 5,978,828 A | 11/1999 | Greer | |
| 5,982,445 A | 11/1999 | Eyer | |
| 5,987,509 A | 11/1999 | Portuesi | |
| 5,991,596 A | 11/1999 | Cunningham | |
| 5,991,799 A | 11/1999 | Yen | |
| 6,002,394 A | 12/1999 | Schein | |
| 6,002,444 A | 12/1999 | Marshall | |
| 6,005,565 A | 12/1999 | Legall | |
| 6,006,256 A | 12/1999 | Zdepski | |
| 6,006,265 A | 12/1999 | Rangan | |
| 6,008,836 A | 12/1999 | Bruck et al. | |
| 6,009,410 A | 12/1999 | LeMole | |
| 6,011,537 A | 1/2000 | Slotznick | |
| 6,012,087 A | 1/2000 | Freivald | |
| 6,018,764 A | 1/2000 | Field | |
| 6,018,768 A | 1/2000 | Ullman | |
| 6,021,426 A | 2/2000 | Douglis | |
| 6,023,698 A | 2/2000 | Lavey | |
| 6,025,236 A | 2/2000 | Mathews | |
| 6,026,435 A | 2/2000 | Enomoto | |
| 6,029,045 A | 2/2000 | Picco | |
| 6,029,193 A | 2/2000 | Yamamoto | |
| 6,034,689 A | 3/2000 | White | |
| 6,035,304 A | 3/2000 | Machida et al. | |
| 6,049,831 A | 4/2000 | Gardell | |
| 6,055,564 A | 4/2000 | Phaal | |
| 6,057,872 A | 5/2000 | Candelore | |
| 6,058,430 A * | 5/2000 | Kaplan | 709/245 |
| 6,061,719 A * | 5/2000 | Bendinelli et al. | 709/218 |
| 6,064,376 A | 5/2000 | Berezowski | |
| 6,064,440 A | 5/2000 | Born | |
| 6,075,568 A | 6/2000 | Matsuura | |
| 6,078,961 A | 6/2000 | Mourad | |
| 6,081,842 A | 6/2000 | Shachar | |
| 6,097,441 A | 8/2000 | Allport | |
| 6,134,379 A | 10/2000 | LaMacchia | |
| 6,141,678 A | 10/2000 | Britt | |
| 6,154,771 A | 11/2000 | Rangan | |
| 6,167,235 A | 12/2000 | Sibecas et al. | |
| 6,169,541 B1 | 1/2001 | Smith | |
| 6,172,673 B1 | 1/2001 | Lehtinen | |
| 6,172,677 B1 | 1/2001 | Stautner | |
| 6,177,931 B1 | 1/2001 | Alexander | |
| 6,178,114 B1 | 1/2001 | Anderson | |
| 6,195,692 B1 | 2/2001 | Hsu | |
| 6,198,511 B1 * | 3/2001 | Matz et al. | 348/553 |
| 6,199,206 B1 | 3/2001 | Nishioka | |
| 6,201,538 B1 | 3/2001 | Wugofski | |
| 6,215,483 B1 | 4/2001 | Zigmond | |
| 6,229,532 B1 | 5/2001 | Fujii | |
| 6,229,541 B1 | 5/2001 | Kamen | |
| 6,240,555 B1 * | 5/2001 | Shoff et al. | 725/110 |
| 6,243,741 B1 | 6/2001 | Utsumi | |
| 6,253,204 B1 | 6/2001 | Glass | |
| 6,253,228 B1 | 6/2001 | Ferris | |
| 6,256,785 B1 | 7/2001 | Klappert | |
| 6,260,192 B1 | 7/2001 | Rosin | |
| 6,263,505 B1 | 7/2001 | Walker | |
| 6,268,849 B1 * | 7/2001 | Boyer et al. | 725/40 |
| 6,285,407 B1 | 9/2001 | Yasuki | |
| 6,314,569 B1 | 11/2001 | Chernock | |
| 6,317,780 B1 | 11/2001 | Cohn | |
| 6,317,885 B1 | 11/2001 | Fries | |
| 6,335,736 B1 | 1/2002 | Wagner | |
| 6,348,932 B1 * | 2/2002 | Nishikawa et al. | 715/719 |
| 6,351,270 B1 * | 2/2002 | Nishikawa et al. | 715/717 |
| 6,357,042 B2 | 3/2002 | Srinivasan | |
| 6,367,080 B1 | 4/2002 | Enomoto | |
| 6,373,503 B1 | 4/2002 | Perkes | |
| 6,374,404 B1 * | 4/2002 | Brotz et al. | 725/46 |
| 6,400,407 B1 | 6/2002 | Zigmond | |
| 6,412,111 B1 | 6/2002 | Cato | |
| 6,415,319 B1 | 7/2002 | Ambroziak | |
| 6,415,438 B1 | 7/2002 | Blacketter | |
| 6,446,261 B1 | 9/2002 | Rosser | |
| 6,460,180 B1 | 10/2002 | Park | |
| 6,473,903 B2 * | 10/2002 | Balakrishnan et al. | 725/135 |
| 6,502,243 B1 * | 12/2002 | Thomas | 725/110 |
| 6,510,557 B1 | 1/2003 | Thrift | |
| 6,510,558 B1 * | 1/2003 | Iinuma et al. | 725/113 |
| 6,512,551 B1 | 1/2003 | Lund | |
| 6,522,342 B1 | 2/2003 | Gagnon | |
| 6,530,082 B1 | 3/2003 | Del Sesto | |
| 6,560,777 B2 * | 5/2003 | Blackketter et al. | 725/110 |
| 6,564,379 B1 | 5/2003 | Knudson | |
| 6,571,392 B1 | 5/2003 | Zigmond et al. | |
| 6,584,153 B1 | 6/2003 | Comito | |
| 6,600,496 B1 * | 7/2003 | Wagner et al. | 715/716 |
| 6,604,239 B1 | 8/2003 | Kohen | |
| 6,604,242 B1 | 8/2003 | Weinstein | |
| 6,615,408 B1 * | 9/2003 | Kaiser et al. | 725/112 |
| 6,662,007 B2 | 12/2003 | Yuen | |
| 6,668,378 B2 | 12/2003 | Leak | |
| 6,681,393 B1 | 1/2004 | Bauminger | |
| 6,698,020 B1 * | 2/2004 | Zigmond et al. | 725/34 |
| 6,718,551 B1 | 4/2004 | Swix et al. | |
| 6,725,461 B1 * | 4/2004 | Dougherty et al. | 725/40 |
| 6,751,800 B1 * | 6/2004 | Fukuda et al. | 725/40 |
| 6,754,905 B2 | 6/2004 | Gordon | |
| 6,766,524 B1 | 7/2004 | Matheny | |
| 6,785,902 B1 | 8/2004 | Zigmond | |
| 6,886,178 B1 * | 4/2005 | Mao et al. | 725/52 |
| 6,912,726 B1 * | 6/2005 | Chen et al. | 725/113 |
| 6,928,652 B1 | 8/2005 | Goldman | |
| 6,938,270 B2 * | 8/2005 | Blackketter et al. | 725/112 |
| 6,990,676 B1 * | 1/2006 | Proehl et al. | 725/40 |
| 6,990,678 B2 | 1/2006 | Zigmond | |
| 7,103,904 B1 | 9/2006 | Blacketter | |
| 7,165,266 B2 | 1/2007 | Zigmond | |
| 7,174,562 B1 | 2/2007 | Leak | |

| | | | |
|---|---|---|---|
| 7,178,162 B2 | 2/2007 | Martinolich et al. | |
| 7,181,756 B1 | 2/2007 | Zigmond | |
| 7,296,282 B1 | 11/2007 | Koplar | |
| 2001/0001160 A1 | 5/2001 | Shoff | |
| 2002/0007493 A1 | 1/2002 | Butler | |
| 2002/0010926 A1 | 1/2002 | Lee | |
| 2002/0053077 A1 | 5/2002 | Shah-Nazaroff | |
| 2002/0092017 A1 | 7/2002 | Klosterman et al. | |
| 2002/0133816 A1 | 9/2002 | Greene | |
| 2003/0005463 A1* | 1/2003 | Macrae et al. | 725/112 |
| 2004/0040042 A1 | 2/2004 | Feinleib | |
| 2004/0205810 A1 | 10/2004 | Matheny | |
| 2004/0237119 A1 | 11/2004 | Smith | |
| 2004/0261130 A1 | 12/2004 | Leak | |
| 2005/0028206 A1* | 2/2005 | Cameron et al. | 725/46 |
| 2005/0044571 A1 | 2/2005 | Goldman | |
| 2005/0097594 A1 | 5/2005 | O'Donnell | |
| 2005/0172331 A1 | 8/2005 | Blacketter | |
| 2006/0015893 A1 | 1/2006 | Kitsukawa | |
| 2007/0107030 A1 | 5/2007 | Zigmond | |

FOREIGN PATENT DOCUMENTS

| | | |
|---|---|---|
| EP | 0942595 | 9/1999 |
| GB | 2338364 | 12/1999 |
| WO | 97-22207 | 6/1997 |
| WO | 98-17064 | 4/1998 |
| WO | 98-41020 | 9/1998 |
| WO | 98-53611 | 11/1998 |
| WO | 01-01270 | 1/2001 |

OTHER PUBLICATIONS

"Advanced Television Enhancement Forum Specification (ATVEF)" Copyright ATVEF, 1998,1999 Draft, Version 1.1r26 updated Feb. 2, 1999 pp. 1-37.*

"WebTV Networks Introduces It's Revolutionary Next-Generation System-WebTV Plus" on Network Computing News, Sep. 16, 1997 downloaded from www.ncns.com Jul. 3, 2008.*

"WebTV Plus.. Is it Worth an Upgrade?" by Dexter Davenport on net4tv, Apr. 1, 1998 downloaded from www.net-4tv.com Jul. 3, 2008.*

U.S. Appl. No. 10/133,554, filed Apr. 26, 2002, Zigmond.

Electronic Industries Association EIA-746A, "Transport of Internet Uniform Resource Locator (URL) Information using Text-2 (T-2) Service" (Sep. 1998).

"Uniform Resource Locators for Television Broadcasts," D. Zigmond, (Jun. 1997).

"Uniform Resource Locators for Television and Telephony," D. Zigmond (Oct. 1996).

Advanced Television Enhancement Forum Specification (ATVEF), Version 1.1 revision 26, (Feb. 2, 1999).

R. Panabaker, S. Wegerif, and D. Zigmond, "The Transmission of IP Over the Vertical Blanking Interval of a Television Signal," (Feb. 1999).

"Creating Interactive Television Links," http://developer.webtv.net/itv/links/main.htm (Jun. 9, 1999).

"Displaying Television Broadcasts in Web Pages," http://developer.erbtv.net/itv/embedtv.main.htm (Jun. 9, 1999).

Electronic Industries Association EIA-608, "Recommended Practice for Line 21 Data Service" (Sep. 1994).

Request for Comments (RFC) 791, "Internet Protocol, DARPA Internet Protocol Specification," Sep. 1981.

Bryant, Stewart Dr., "The Liberate Technologies TV Navigator for DTV: A Think Web-Centric Client for Digital Television".

Electronic Industries Association EIA—516, "Joint EIA/CVCC Recommended Practice for Teletext: North American Basic Teletext Specification (NABTS)", 89 pages (May 1988).

Advanced Television Enhancement Forum Specification (ATVEF), comment draft Version 1.0, Revision 1, 19 pages (Aug. 1998).

Advanced Television Enhancement Forum Specification (ATVEF), Draft Version 1.1, Revision 19, 32 Pages (Aug. 1998).

Prestion Galla, "How the Internet Works", Special Edition, pp. 66, 67, 142, 143, 150, 151,260, 261, 278, 279 (1997).

Intel Intercast Website, "How Does It Work", Pages from www.intercast.com, 8 pages (Jan. 29, 1999).

J. Daniel Gifford, "Teletext Decoder", Radio-Electronics, Apr. 1996, pp. 45-49.

S. Deering, "Host Extensions for IP Multicasting" (Aug. 1989).

J. Postel, "User Datagram Protocol," (Aug. 1980), identified as page "ftp://ftp.isi.edu/in-notes/rfc768.txt".

ECMA—European Association for Standardizing Information and Communication systems, "Standard ECMA—262, 2nd Edition" (Aug. 1998).

W3C, "Document Object Model (DOM) Level 1 Specification" (Oct. 1998), Identified as page, http://www.w3.org/TR/1998/REC-DOM-Level-1-19981001/DOM.txt.

W3c, "HTML 4.0 Specification," Chapters 1-18 (Apr. 1998), Identified as page, http://www.w3.org/TR/REC-html40/.

"Netcentives Launches Global Incentive Program," Netcentives Press (download Oct. 25, 1999) Identified as pages "http://www.netcentives.com/press/archive/NC19991021a.html".

"ClickReward™, It all adds up," Netcentives Press (Download Oct. 25, 1999) Identified as page "http.www.netcentives.com/clickrewards/index.html".

Michael B Jones, "The Microsoft Interactive TV System: An Experience Report", pp. 17 (Jul. 1997)

Office Action dated Mar. 29, 2004 cited in Patent No. 7,174,562.

Office Action dated Jul. 8, 2004 cited in Patent No. 7,174,562.

Office Action dated Apr. 20, 2005 cited in Patent No. 7,174,562.

Office Action dated Aug. 12, 2005 cited in Patent No. 7,174,562.

Office Action dated Jan. 31, 2006 cited in Patent No. 7,174,562.

Office Action dated Jul. 3, 2006 cited in Patent No. 7,174,562.

Notice of Allowance dated Oct. 10, 2006 cited in Patent No. 7,174,562.

Office Action dated Dec. 13, 2007 cited in U.S. Appl. No. 10/893,518.

Office Action dated Jun. 19, 2008 cited in U.S. Appl. No. 10/893,518.

Office Action dated Dec. 19, 2002 cited in U.S. Appl. No. 09/345,247.

Notice of Allowance dated Jun. 4, 2003 cited in U.S. Appl. No. 09/345,247.

Office Action dated Jul. 5, 2002 cited in U.S. Appl. No. 09/295,436.

Notice of Allowance dated Jan. 15, 2003 cited in U.S. Appl. No. 09/295,436.

Office Action dated Dec. 6, 2000 cited in U.S. Appl. No. 09/295,746.

Office Action dated Jul. 18, 2001 cited in U.S. Appl. No. 09/295,746.

Notice of Allowanced dated May 21, 2002 cited in U.S. Appl. No. 09/295,746.

Office Action dated May 9, 2001 cited in U.S. Appl. No. 09/087,354.

Office Action dated Jan. 31, 2002 cited in U.S. Appl. No. 09/087,354.

Office Action dated Dec. 17, 2002 cited in U.S. Appl. No. 09/087,354.

Office Action dated Jun. 19, 2003 cited in U.S. Appl. No. 09/087,354.

Office Action dated Dec. 8, 2003 cited in U.S. Appl. No. 09/087,354.

Office Action dated May 5, 2004 cited in U.S. Appl. No. 09/087,354.

Notice of Allowance dated Jul. 13, 2004 cited in U.S. Appl. No. 09/087,354.

Supplemental Notice of Allowability dated Mar. 10, 2005 cited in U.S. Appl. No. 09/087,354.

Office Action dated Apr. 12, 2000 cited in U.S. Appl. No. 09/099,481.

Notice of Allowance dated Sep. 11, 2000 cited in U.S. Appl. No. 09/099,481.

Supplemental Notice of Allowability dated Nov. 9, 2000 cited in U.S. Appl. No. 09/099,481.

Office Action dated Feb. 13, 2004 cited in U.S. Appl. No. 09/788,985.

Office Action dated Nov. 17, 2004 cited in U.S. Appl. No. 09/788,985.

Notice of Allowance dated Jun. 17, 2005 cited in U.S. Appl. No. 09/788,985.

Notice of Allowance dated Oct. 31, 2006 cited in U.S. Appl. No. 11/216,250.

Office Action dated May 9, 2003 cited in U.S. Appl. No. 09/345,223.

Office Action dated Nov. 21, 2003 cited in U.S. Appl. No. 09/345,223.

Office Action dated Jun. 3, 2004 cited in U.S. Appl. No. 09/345,223.

Office Action dated Oct. 20, 2005 cited in U.S. Appl. No. 09/345,223.

Notice of Allowance dated Jun. 14, 2006 cited in U.S. Appl. No. 09/345,223.

Office Action dated Aug. 14, 2002 cited in U.S. Appl. No. 09/287,985.
Office Action dated Apr. 21, 2003 cited in U.S. Appl. No. 09/287,985.
Office Action dated Sep. 25, 2003 cited in U.S. Appl. No. 09/287,985.
Office Action dated Mar. 29, 2004 cited in U.S. Appl. No. 09/287,985.
Notice of Allowance dated Mar. 2, 2005 cited in U.S. Appl. No. 09/287,985.
Office Action dated Apr. 10, 2003 cited in U.S. Appl. No. 09/566,695.
Notice of Allowance dated Mar. 1, 2004 cited in U.S. Appl. No. 09/566,695.
Office Action dated Oct. 27, 2003 cited in U.S. Appl. No. 09/566,695.
Office Action dated Oct. 22, 2007 cited in U.S. Appl. No. 10/835,196.
Office Action dated Jul. 9, 2008 cited in U.S. Appl. No. 10/835,196.
Office Action dated Dec. 24, 2008 cited in U.S. Appl. No. 10/835,196.
Notice of Allowance dated Jan. 8, 2009 cited in U.S. Appl. No. 10/893,518.
Office Action dated Dec. 30, 2008 cited in U.S. Appl. No. 11/614,759.
Office Action dated Nov. 22, 2000 cited in U.S. Appl. No. 09/412,839.
Office Action dated Jul. 18, 2001 cited in U.S. Appl. No. 09/412,839.
Notice of Allowance dated Feb. 25, 2002 cited in U.S. Appl. No. 09/412,839.
Office Action dated Oct. 16, 2007 cited in U.S. Appl. No. 10/918,864.
Office Action dated May 13, 2008 cited in U.S. Appl. No. 10/918,864.
Office Action dated Jan. 21, 2009 cited in U.S. Appl. No. 10/918,864.
"WebTV Networks Introduces It's Revolutionary Next-Generation System-Web TV Plus", on Network Computing News, Sep. 16, 1997, Downloaded from www.ncns.com Jul. 3, 2008.
"WebTV Plus.. Is it Worth an Upgrade?" by Dexter Davenport on Net4tv, Apr. 1, 1998, Downloaded form www.net-4tv.com, Jul. 3, 2008.
Office Action dated Aug. 5, 2008 cited in U.S. Appl. No. 11/093,666.
Office Action dated Feb. 4, 2009 cited in U.S. Appl. No. 11/093,666.
Notice of Allowance dated Apr. 30, 2009 cited in U.S. Appl. No. 10/893,518.
Office Action dated Aug. 5, 2009 cited in U.S. Appl. No. 11/614,759.
Office Action dated Aug. 31, 2009 cited in U.S. Appl. No. 10/835,196.
Notice of Allowance dated Dec. 31, 2009 cited in U.S. Appl. No. 11/614,759.
Office Action dated Feb. 17, 2010 cited in U.S. Appl. No. 10/918,864.
U.S. Appl. No. 11/614,759, mailed Mar. 22, 2010, Notice of Allowance.
U.S. Appl. No. 10/835,196, mailed Sep. 2, 2010, Notice of Allowance.
Office Action dated Jun. 28, 2012 cited in U.S. Appl. No. 12/951,974.

\* cited by examiner

COMMUNICATING SCRIPTS IN A DATA SERVICE CHANNEL OF A VIDEO SIGNAL

CROSS-REFERENCE TO RELATED APPLICATIONS

The present application is a continuation application of commonly-assigned U.S. patent application Ser. No. 09/287,985 filed Apr. 7, 1999, of the same title and which is incorporated herein by reference.

BACKGROUND OF THE INVENTION

1. The Field of the Invention

The invention relates generally to supplementing broadcast television programming with information of interest to broadcast viewers.

2. Background and Relevant Art

The Internet is a worldwide collection of networks and gateways. The Internet includes a backbone of high-speed data communication lines between major nodes, consisting of thousands of commercial, government, educational, and other computer systems, that route data and messages. The World Wide Web (the Web) is a collection of formatted hypertext pages located on numerous computer systems around the world that are logically connected by the Internet. The Web has become a valuable resource for information relating many subjects.

Web browsers, software providing user interfaces to the Web, allow individuals to access Internet content from personal computers. Internet terminals, such as those pioneered by WebTV Networks, Inc., the assignee of the present invention, have made the Web accessible to an even larger segment of the population by providing Web access without a personal computer. Internet terminals (also commonly referred to as set-top boxes) provide Web access using an ordinary television (TV) set as a display and a remote control or wireless keyboard for user input.

FIG. 1 illustrates a basic configuration of an Internet system and broadcast television network 100. Network 100 includes a pair of clients 110 and a receiver/client 112. Receiver/client 112 is so named because it operates both as a television receiver and as an Internet client. Hereafter, receiver/client 112 is referred to as receiver 112 for simplicity.

Clients 110 and receiver 112 are coupled to a modem pool 120 via direct-dial, bi-directional data connections 130, which may be telephone (POTS, i.e., "plain old telephone service"), cable, satellite forward channels, ISDN (Integrated Services Digital Network), or any other similar type of connection. Modem pool 120 is typically coupled to a number of remote servers 140 via a network infrastructure, such as the Internet 160. An additional server 150 specifically supports receiver 112.

Clients 110 and receiver 112 communicate bi-directionally with servers 140 and 150 through modem pool 120 and the Internet 160. Modem pool 120 is typical of those found today throughout the world providing access to the Internet and private networks. In addition to communicating with servers 140 and 150, receiver 112 receives broadcast data and video from a broadcast television network 170 via, e.g., antennas 175 or a cable network (not shown).

FIG. 2 illustrates an embodiment of receiver 112. Receiver 112 includes set-top box 200, an ordinary analog television set. 210, and a remote control 220. Set-top box 200 may be integrated with television set 210. Television set 210 displays video data, including a graphical user interface, conveyed from set-top box 200 by a video link 230. Video link 230 is an RF (radio frequency), S-video, composite video, or other video link.

Set-top box 200 includes hardware and software for receiving and decoding a broadcast video signal 240, such as an NTSC, PAL, SECAM, or other TV system video signal, and for providing video data to the television set via video link 230. Set-top box 200 also includes hardware and/or software for providing a user with a graphical user interface 250 capable of displaying Web pages (e.g., HTML or XML pages) and broadcast video. User interface 250 can notify the user of the presence of encoded data embedded in the video signal. The notification may be audible, visual, or a combination of the two. For example, user interface 250 might temporarily display an icon in a portion of the screen.

Set-top box 200 may include both a standard modem and an ISDN modem, such that the communication link between set-top box 200 and server 150 (FIG. 1) can be either a telephone (POTS) connection 260 or an ISDN connection 270. Set-top box 200 receives power through a power line 280.

A user operates remote control 220 to control set-top box 200 in browsing the Web, sending e-mail, and performing other Internet-related functions. Set-top box 200 receives commands from remote control 220 via an infrared (IR) communication link 290. A keyboard (not shown) may also be included.

Exemplary Receiver System Architecture

FIG. 3 is a block diagram illustrating internal features of set-top box 200. Set-top box 200 is controlled by a processing unit, such as central processing unit (CPU) 300, which is coupled to an Application-Specific Integrated Circuit (ASIC) 310. ASIC 310 contains circuitry that implements certain features provided by set-top box 200. ASIC 310 is coupled to an audio digital-to-analog converter (DAC) 320 that provides audio output to television 210. ASIC 310 is also coupled to a video encoder 330 that provides video output to television 210. An IR interface 335 detects IR signals transmitted by remote control 220 and, in response, provides corresponding electrical signals to ASIC 310. A standard telephone modem 340 and/or an ISDN modem 342 are coupled to ASIC 310 to provide connections 260 and 270, respectively, to the Internet.

A television (TV) interface 345 conveys broadcast video signals to ASIC 310, allowing video data carried in broadcast video signal 240 to be presented to a viewer on TV 210. TV interface 345 also extracts other data that may be embedded in the video signal. The data so extracted, or a portion thereof, may be displayed concurrently with a television program. For example, analog broadcast signals typically include a portion known as the vertical blanking interval (VBI) that is used to transmit, among other things, closed captioning information. Data inserted into the VBI are extracted by TV interface 345 and displayed on the TV 210.

Set-top box 200 also includes read-only Memory (ROM) 350, a random-access memory 355, and a mass storage device 360. ROM 350 stores program code for application software executed by CPU 300. RAM 355 serves as temporary storage for CPU 300 as CPU 300 executes instructions. Mass storage device 360 may be used to input software or data to set-top box 200 or to store information received either from network connections or from broadcast signals. Mass storage device 360 includes any suitable data storage medium, such as magnetic tapes, magnetic disks, and optical disks.

A number of companies support appliances similar to receiver 112 to enhance broadcast television with Internet content. For example, Intel® Intercast® technology offers a VBI inserter that enables content creators to insert Web pages into the VBI of a broadcast signal. Dedicated receiver platforms then sample the VBI of the broadcast signal to obtain and display the Web pages. Unfortunately, the bandwidth of the VBI is limited, so content-rich Web pages can be slow to broadcast. As a result, content updates can be undesirably slow.

WebTV® for Windows® is similar to Intercast® technology, but has the ability to update information presented by a broadcast Web page by broadcasting a script capable of interacting with the Web page. Targeted receivers receive the script and store the script in memory for later use. The content creator then causes the script to be executed by broadcasting a message that identifies the stored script and the Web page with which the script is to interact.

The broadcasting techniques of WebTV® for Windows® work well to update information presented by Web pages. However, the processes of downloading, storing, and later triggering a script are collectively complex and time consuming. Further, such scripts are not themselves incorporated into the language defining Web pages, but instead remain separate from the Web pages with which they interact. Broadcast scripts can therefore alter the image presented by a Web page but are limited in their ability of change the functionality of the page.

BRIEF SUMMARY OF THE INVENTION

The present invention is directed to methods and apparatus for enhancing an information resource, such as a Web page, simultaneously residing in memory on a number of remote receivers.

Web pages are authored using HTML, for "Hypertext Markup Language." HTML uses tags to mark elements, such as text and graphics, in a document to indicate how web browsers should display these elements to the user and respond to user actions. HTML pages may also include one or more scripts that allow HTML page authors to dynamically control the interaction and behavior of their pages.

For purposes of the present invention, the HTML tags and scripts of a given Web page define the "context" of that page. This context is distinct from the visual image provided by a page, which can vary between two identical HTML pages depending upon a receiver's interpretation of the page and upon the resources referred to by the page. For example, a tag within an HTML page may refer to an image that is independent of the page: altering the image will change the visual representation of the page without changing the context of the page. The present invention allows content creators to alter both the visual representation of a given page and the context of the page by allowing content creators to broadcast scripts directed to specified Web pages.

In accordance with the invention, a content creator, (e.g., a program producer, broadcaster, affiliate, cable company, or satellite provider), embeds a trigger in a data service channel of a broadcast video signal. The embedded trigger includes a resource identifier unique to a targeted information resource and a script capable of modifying the information resource. The script might be a script or a segment of a script written in a scripting language, such as JavaScript™, ECMAScript, JScript™, or VBScript. Such scripts allow content creators to provide interaction between an information resource and a viewer, to control the receiver, and to dynamically create HTML content.

The script-bearing triggers (hereafter "script triggers") are broadcast in the data service channel of a broadcast video signal. Each receiver adapted to interpret trigger content begins with an information resource, such as a Web page, resident in memory. The receiver can obtain such a resource via the Internet, broadcast video, or from local storage. The receivers, tuned into the appropriate broadcast signal, monitor the data service channel of that signal for triggers that are directed to the information resource resident on the receiver. Upon receipt of such a script trigger, the receiver executes the script contained within the trigger to alter the information resource and/or displayed video defined by the resource.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
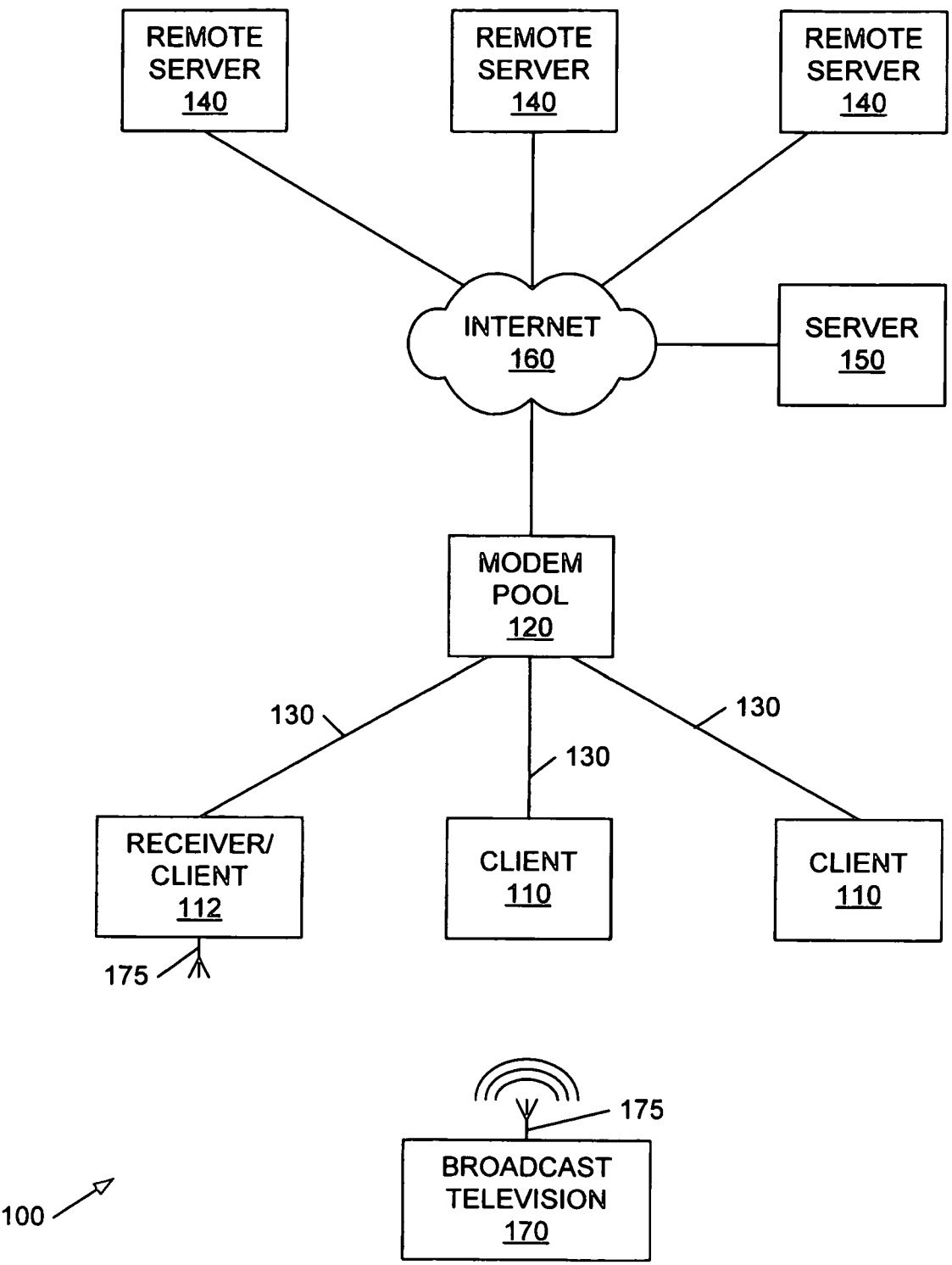
FIG. 1 (prior art) illustrates a basic configuration of an Internet system network 100.
Figure 2:
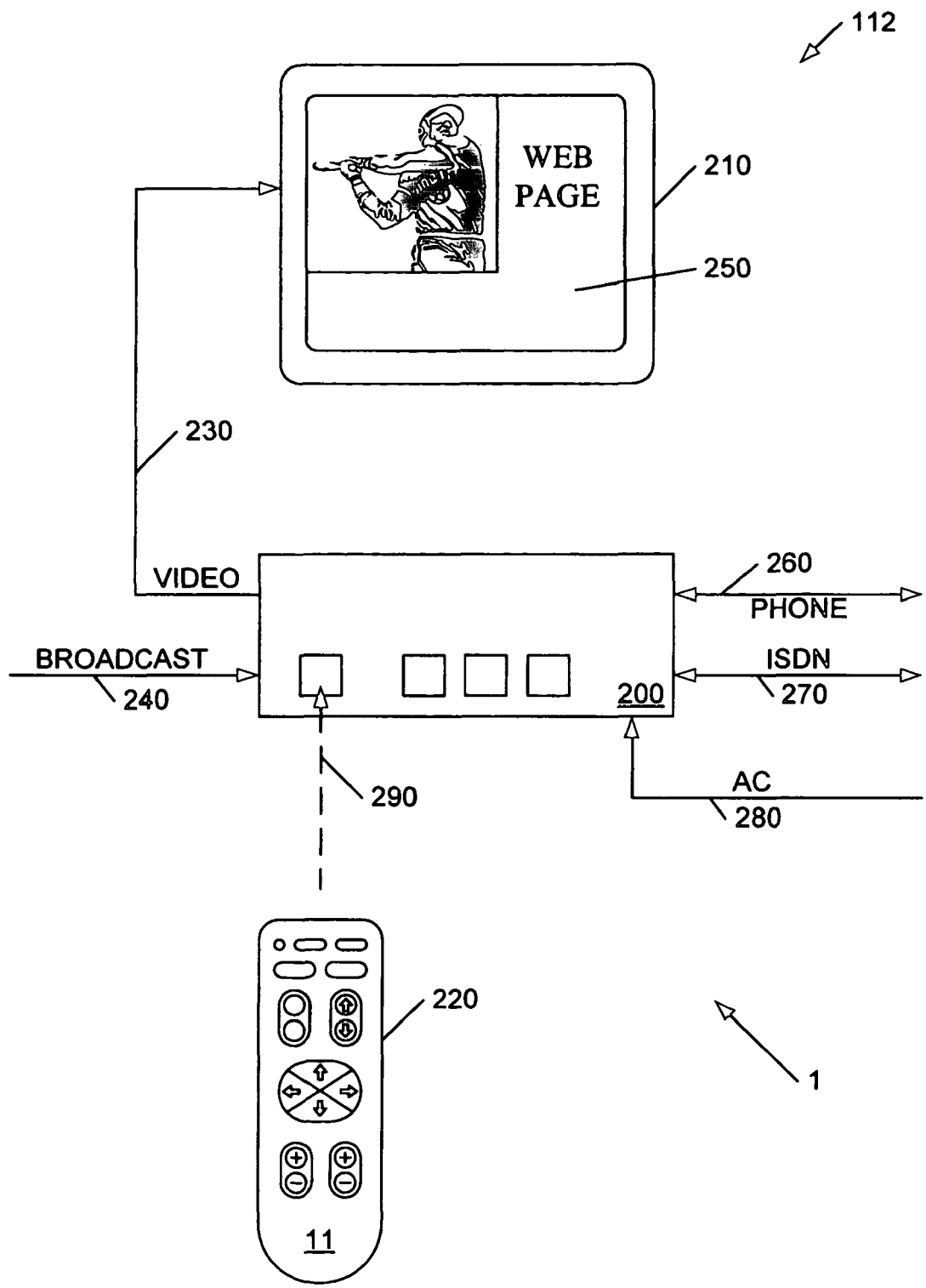
FIG. 2 (prior art) illustrates an embodiment of a receiver/client 112 for displaying broadcast television and Internet content.
Figure 3:
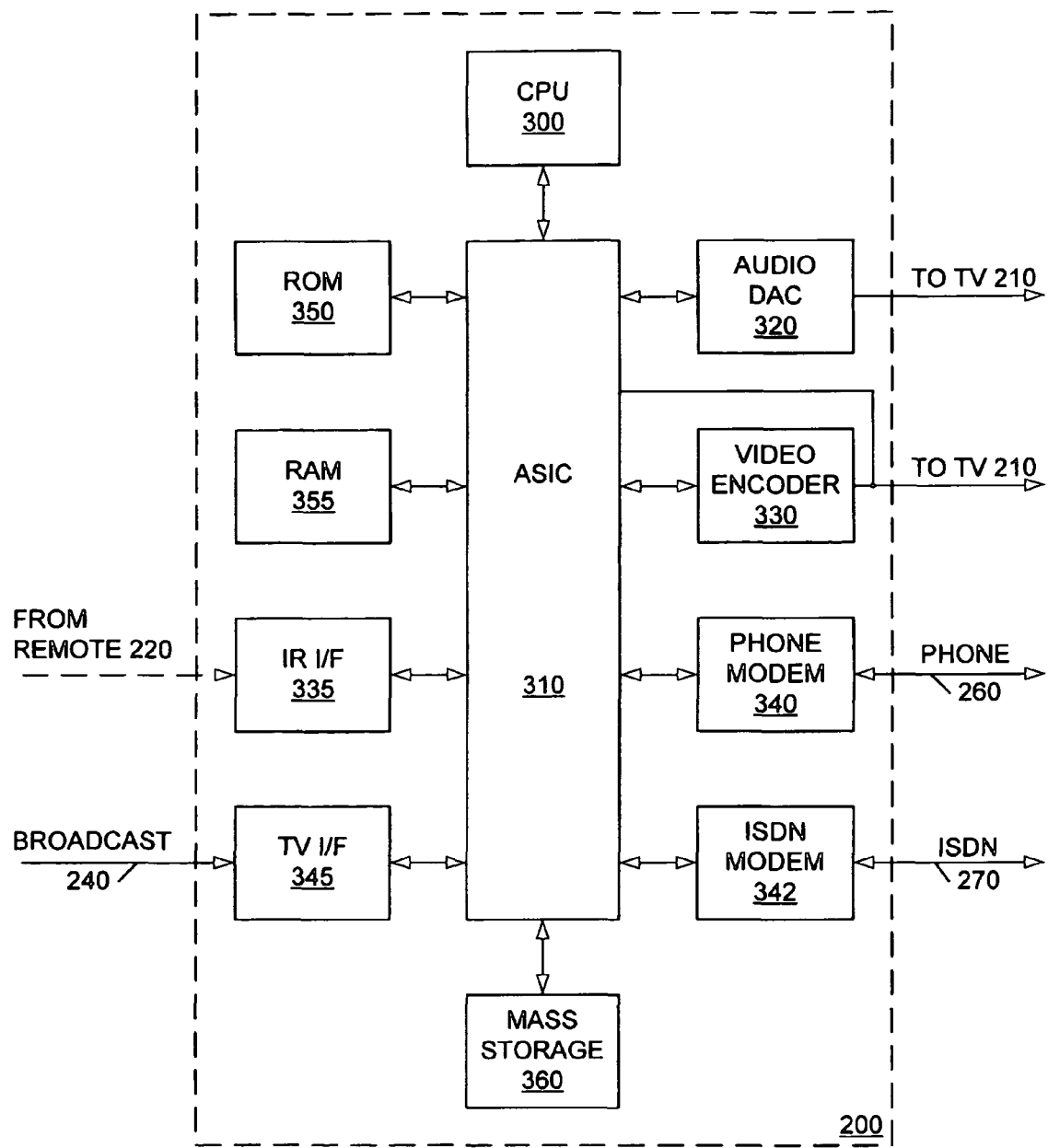
FIG. 3 (prior art) is a block diagram illustrating internal features of a set-top box 200.
Figure 4:
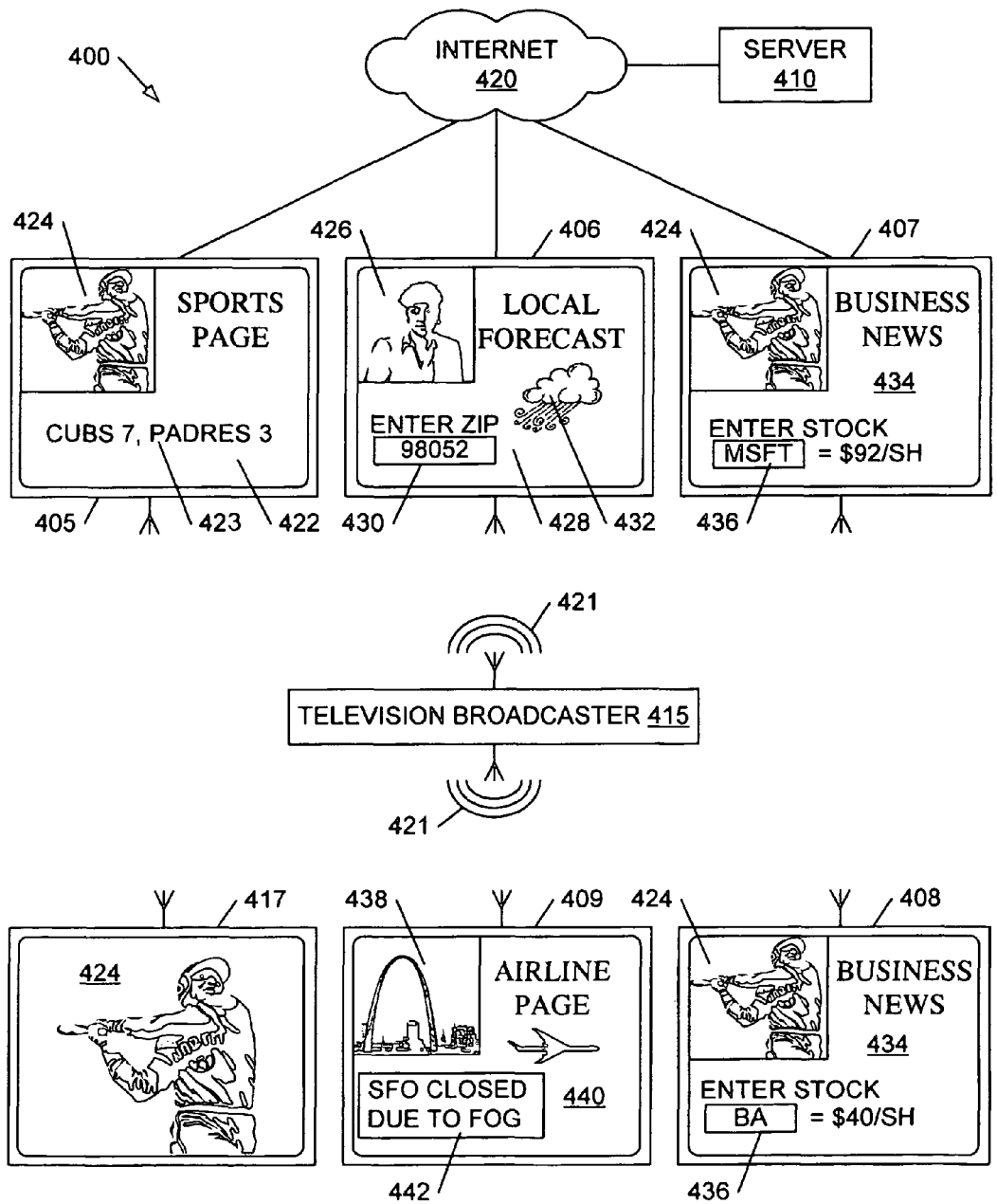
FIG. 4 illustrates a communication system 400, including five content receivers 405-409 configured in accordance with the invention.

FIG. 4 illustrates a communication system 400, including five content receivers 405-409 configured in accordance with the invention. Communication system 400 also includes two content sources, a web server 410 and a television broadcaster 415, and a conventional television 417. Web server 410 communicates with each of receivers 405-407 via the Internet 420, while broadcaster 415 communicates to each of receivers 405-409 and television 417 via a broadcast signal 421. Internet 420 is understood to include all modems, lines, and other intervening components required to communicate between server 410 and receivers 405-407.

Each of receivers 405-409 is configured to display Web pages, broadcast television, or both. Web pages are typically downloaded over the Internet, but may also be received from a broadcast television signal or retrieved from a local memory source, such as a disk drive. In each case, however, the Web pages are stored locally on the receivers.

Receiver 405 displays a "Sports Page" Web page 422 along with a broadcast baseball game 424. In accordance with the invention, a portion of web page 422, game score 423, for example, can be updated in response to a script received from broadcaster 415. Sports page 422 can thus be synchronized with baseball game 424 without connecting to the Internet. Updating just a portion of sports page 422 advantageously requires less bandwidth than updating the entire page.

Receiver 406 illustrates another advantage of this embodiment. Receiver 406 includes broadcast video 426 and a "Local-Forecast" page 428. Web page 428 includes a form field 430 inviting a user to enter a local zip code. In accordance with the illustrated embodiment, broadcaster 415 can provide periodic script triggers including scripts that interact with the zip code to provide weather updates specific to the selected zip code. Such updates might include textual weather information or graphics, such as weather symbol 432. A number of scripting languages support this type of interaction between a page and the user. Exemplary scripting languages include JavaScript, ECMAScript, JScript™, and VBScript. Alternatively, broadcaster 415 can modify page 428 to include additional functionality by broadcasting a script for incorporation into page 428.

The following text is HTML code defining Local Forecast page 428. The HTML code includes a script entitled "Zip Code Weather" at <http://www.weatherzip.com/page.html> for accepting a zip code and responding to script triggers directed to particular zip codes. The script is written using the ECMAScript scripting language.

```
<HTML>
<HEAD><TITLE>Zip Code Weather</TITLE></HEAD>
<BODY>
<SCRIPT>
function newWeather(zip, weather) {
    if (zip=zipForm.userZip)
        weatherPic.src = weather + ".gif";
}
</SCRIPT>
<P>Your Zip: <FORM NAME=zipForm><INPUT TYPE="text" NAME="userZip"></FORM></P>
<P>Today's Weather: <IMG NAME=weatherPic SRC="sunny.gif"></P>
</BODY>
</HTML>
```

The foregoing weather script can be included in an original broadcast of page 428 or can be appended to page 428 using a script trigger that includes the requisite script (i.e., the portion of the foregoing HTML code between and including the <SCRIPT LANGUAGE> and </SCRIPT> tags). In either case, once page 428 includes the script a content creator can update page 428 to include a local forecast for zip code 98502 by broadcasting the following exemplary script trigger: <http://www.weatherzip.com/page.html>[script:newWeather ("98502","snow")] [464c]The "URL" field (separated by angle brackets) identifies the target page, while the script field identifies the script and related arguments to be passed to the target page. The final field includes a checksum value for error detection. The specifics of script-trigger syntax are described below.

Receivers 407 and 408 illustrate yet another advantage of this embodiment. Receivers 407 and 408 each illustrate an example in which a user simultaneously views broadcast baseball game 424 and a "Business News" page 434. Business News page 434 might be in information resource associated with a particular business channel or program that periodically broadcasts script triggers to news page 434 that provide timely stock prices for a series of companies, each company identified by a symbol.

Business News page 434 includes a form field 436 that invites a user to enter a symbol corresponding to a public company. In the depicted example, receiver 407 includes the symbol MSFT in form field 436, while receiver 408 includes the symbol BA. Receiver 407 then receives and displays the MSFT stock price upon receipt of a script trigger directed to page 434 and specifying the symbol MSFT; similarly, receiver 408 receives and displays the BA stock price upon receipt of a script trigger directed to page 434 and specifying the symbol BA. Thus, instead of requiring a broadcaster to display all stock prices, individual users can adapt their environments to suit their own tastes.

A displayed television channel need not be related to a displayed web page. For example, receiver 407 can tune into two channels simultaneously so that a user can watch a television program on one channel (e.g., baseball game 424) while receiver 407 monitors the second channel for enhancements to business page 434. Tuners capable of monitoring two or more channels simultaneously are well known in the art.

In each of the foregoing examples, the receiver responded to some input from the user. The invention is not, however, limited to interactive applications. For example, receiver 409 is shown simultaneously displaying a television show 438 and an airline page 440. Broadcaster 415 can cause airline page 440 to be updated by transmitting a script trigger to page 440 without requiring any user interaction. In the example, airline page 440 includes a text field 442 advising the viewer that San Francisco International Airport (SFO) is closed due to fog.

Script Triggers

Having described an exemplary environment in which script triggers may be employed, script-trigger syntax and usage will now be discussed. Trigger messages, or "triggers," are instructions broadcast to receivers of broadcast video. Such triggers generally instruct receivers to take a specific action to synchronize the content of a Web page with a broadcast television program. For purposes of the present invention, "script triggers" are triggers that include a script or a portion of a script capable of enhancing a specified information resource.

Script triggers include a resource locator, a script or a portion of a script, and may also include a human-readable name and an expiration time. The resource locator addresses a particular resource to be enhanced by the trigger. In the example of receiver 405 of FIG. 4, script triggers intended to enhance sports page 422 would include a resource locator specific to sports page 422.

A resource locator commonly associated with Web content is the Uniform Resource Locator (URL). A URL is a compact string representation of a location used to identify an abstract or physical resource on the Internet. Of course, alternative means of uniquely identifying content may be employed. For example, it is appreciated that keys (e.g., database indices), network addresses (e.g., IP addresses), and other identification mechanisms, alone or in combination, may be employed to uniquely identify a selected resource. Therefore, while the term URL refers to a specific type of content identifier used in connection with the Web, the term uniform resource identifier is used herein to refer to content/resource identification mechanisms generally.

Script-Trigger Syntax

Script triggers may be transmitted in the VBI of an analog broadcast video signal. The text service channels of line 21 of the VBI provide a robust communication medium, albeit at relatively low bandwidth. In some embodiments of the invention, triggers are text based, and their syntax follows a basic format that complies with the Electronic Industries Association EIA-746A, "Transport of Internet Uniform Resource Locator (URL) Information Using Text-2 (T-2) Service" (September 1998), which is incorporated herein by reference. EIA-746A defines the formatting necessary to transmit Internet URLs using the vertical-blanking interval of a broadcast television signal, and is incorporated herein by reference.

In one embodiment that complies with EIA-746A, each script trigger includes a URL followed by zero or more attribute/value pairs and an optional checksum, as follows:

<url>[attr$_1$:val$_1$][attr$_2$:val$_2$] ... [attr$_n$:val$_n$][checksum]

The URL is enclosed in angle brackets. For example, the URL "http://sports.com/scores.html" might identify sports page 422, indicating that a given trigger is intended to update page 422.

The attribute/value pairs can be selected to achieve some desired interaction with the specified resource. A script attribute, formatted as [script:string], provides a script or script fragment to execute within the context of the page identified by the URL. For example, [script:report_stock ("MSFT", "$92/SH")] might be directed to business page 434 to update the stock price displayed to those users specifying MSFT, or to introduce some new functionality to page 434 by amending page 434 to include an additional script. The "string" value is written as an ECMAScript fragment in one embodiment, but can be written in any number of scripting languages.

A "name" attribute, provides the user with readable text. For example "[name:SFO CLOSED DUE TO FOG]" could be used to alert a user as described above in connection with receiver 409. The "name" attribute and the "script" attribute can each provide text messages such as that illustrated on airline page 440. The script attribute is more powerful, however, because scripts can be used to modify the context of page 440. For example, scripts can be broadcast to receiver 406 to incorporate field 430 and the script that provides page 428 with the ability to provide local weather information. Script attributes allow content creators to improve their Web pages without broadcasting complete new pages.

A time stamp indicating a time after which the trigger expires follows an "expires" attribute. One embodiment employs the form yyyymmddThhmmss, where the capital letter "T" separates the date from the time. The time string may be shortened by reducing the resolution. For example yyyymmddThhmm (no seconds specified) is valid, as is simply yyyymmdd (no time specified at all). When no time is specified, expiration is at the beginning of the specified day. The expires attribute can be abbreviated as the single letter "e" (e.g., [e: 19971223]). The "expires" attribute ensures that information contained in triggers is timely. Without this attribute, a rebroadcast of a show might provide an incorrect update, for example an erroneous stock quote.

A checksum may be appended to the end of the logical address link to detect data corruption that may occur during receipt or transmission of a trigger. A two-byte hexadecimal checksum is employed such as a checksum that would be produced by the standard TCP/IP checksum algorithm described in Request For Comments (RFC) 719, "Internet Protocol," September 1981, which is incorporated herein by reference. According to one embodiment, the checksum is computed by pairing adjacent characters in the string (starting with the first delimiter) to form 16-bit integers. If there is an odd number of characters, the final character is paired with a byte value of zero. The checksum is computed such that the one's complement sum of all of the 16-bit integers plus the checksum equals the 16-bit integer with all 1 bits.

For a detailed discussion of the above-described trigger syntax, see the Advanced Television Enhancement Forum Specification (ATVEF), Versions 1.1 revision 26, (Feb. 2, 1999), which is incorporated herein by reference.

Trigger Receiver Objects

Some embodiments of the invention require that intended target resources include a trigger receiver object. The trigger receiver object, implemented by the receiver, processes triggers in the context of the resource containing the trigger object. See the above-incorporated ATVEF specification for a detailed discussion of trigger objects, including their syntax and use in accordance with an embodiment of the invention.

Broadcast Method

Figure 5:
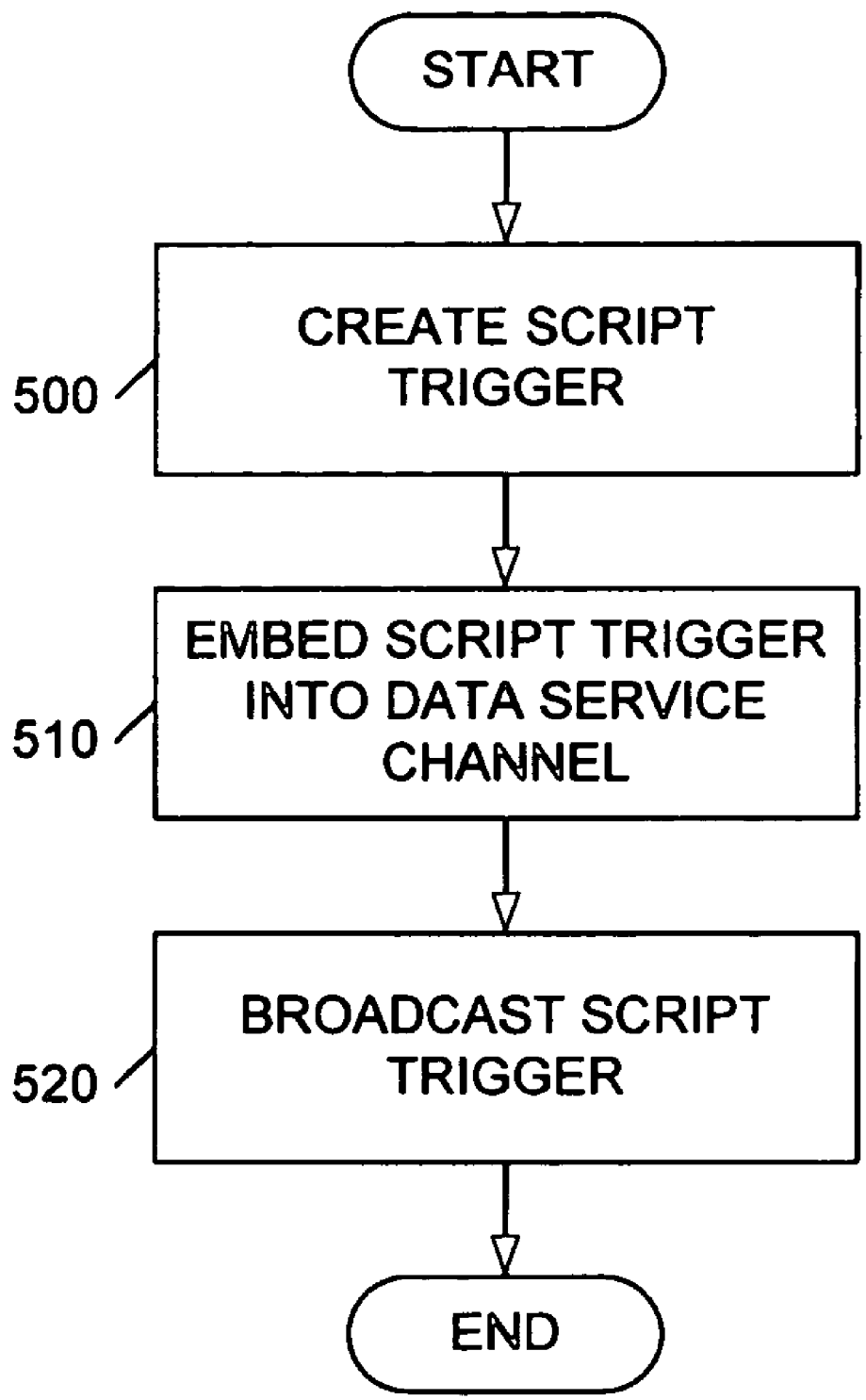
FIG. 5 is a flowchart depicting a method for synchronizing broadcast video data with information resources residing in memory on a number of remote receivers.

FIG. 5 is a flowchart depicting a method employed by a content creator (e.g., a program producer, broadcaster, affiliate, cable company or satellite provider) to synchronize broadcast video data with information resources stored locally on a number of remote receivers. The information resources are, in one embodiment, Web pages (e.g., HTML or XML pages). Information resources are typically displayed, but this is not necessarily the case. For example, a content creator might want to update locally stored pages while the user is watching another channel, or even while the video display is turned off. A user would thus be presented with timely information each time the user selected a particular information resource without having to connect to the Internet or wait for the selected channel to broadcast the latest content.

In accordance with the invention, the content creator first creates a script trigger (step 500) using, for example, the syntax described above. Next, the broadcaster embeds the script trigger into a data service channel of some broadcast signal (step 510). In one embodiment, the broadcast video signal is a National Television Standards Committee (NTSC) video signal including a vertical blanking interval (VBI), and the data service channel is selected from a captioning service channel of a text service channel. The video signal may also be Phase Alternate Lines (PAL), Sequential Couleur Avec Memoire (SECAM), High Definition Television (HDTV), or a digital video signal such as a Digital Video Broadcasting (DVB) signal or an Advanced Television Systems Committee (ATSC) signal.

Where the broadcast video signal is NTSC video signal, the trigger can be imbedded into line 21 of the vertical blanking interval (VBI). The protocols for broadcasting data in line 21 of the VBI call for relatively robust, low-speed communication. Higher bandwidth can be obtained using other lines of the VBI. Finally, the broadcaster broadcasts the script trigger (step 520).

The upstream video may contain previously encoded data in line 21 of the VBI. Each content creator is therefore a potential re-encoding point along the broadcast distribution path. At any re-encoding point, the existing data may be extracted from the captioning data channel or the text service channel of the video signal. Subject to certain bandwidth limitations, the content creator may then embed one or more script triggers into a captioning or text service packet of the video signal. The video signal may then be transmitted to the next downstream receiving device(s). This process may be repeated during video signal processing at each point along the video signal distribution path.

The foregoing broadcast methods are embodied in machine-executable instructions, which can be used to cause a general-purpose or special-purpose processor programmed with the instructions to perform the steps. Alternatively, the steps might be performed by specific hardware components that contain hardwired logic for performing the steps, or by any combination of programmed computer components and dedicated hardware.

Receiver Method

Figure 6:
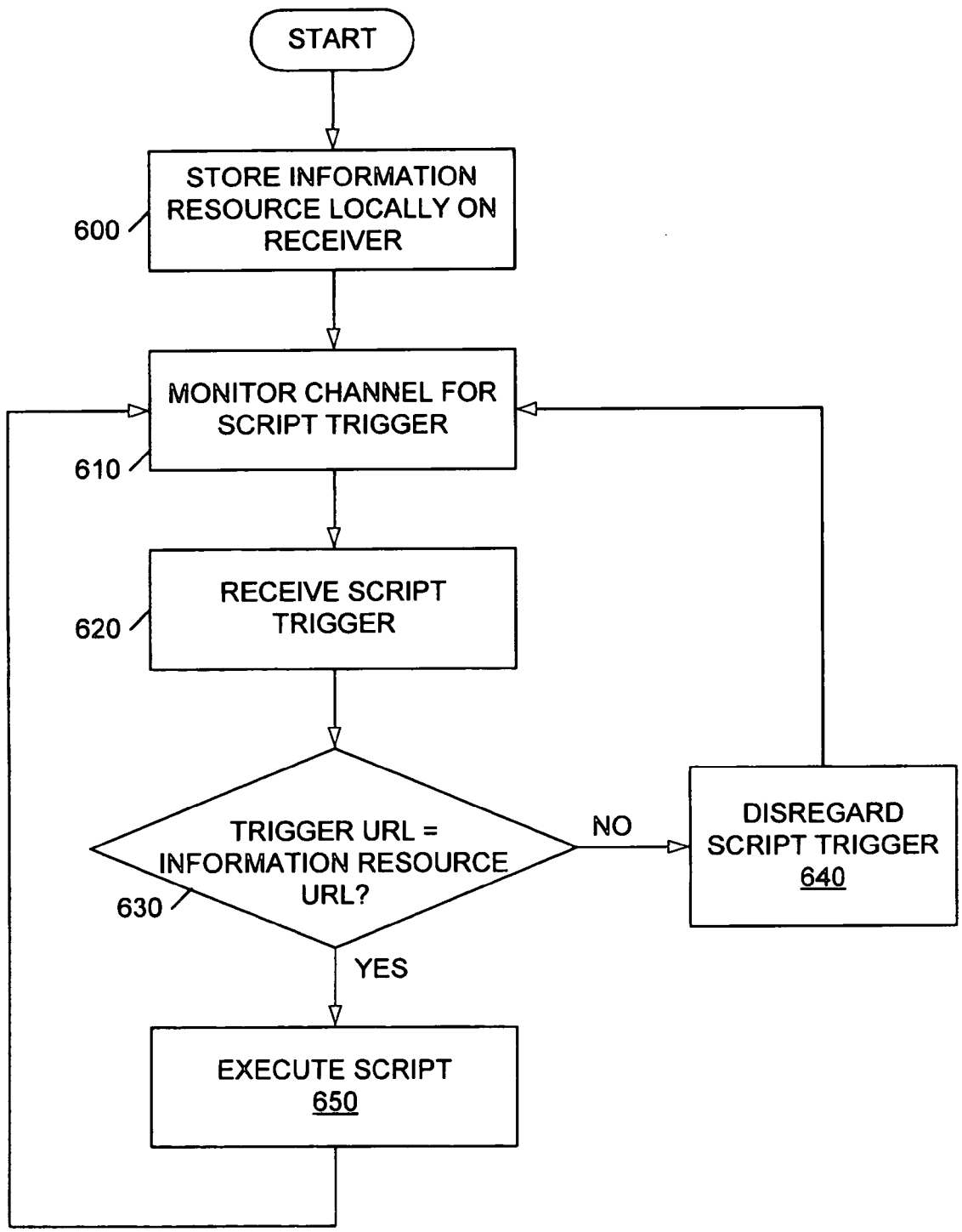
FIG. 6 is a flowchart depicting a method performed by a receiver configured in accordance with the invention to respond to script triggers.

FIG. 6 is a flowchart depicting a method performed by a receiver configured in accordance with the invention to respond to script triggers. First, the receiver stores an information resource, such as a web page, locally in the receiver (step 600). The information resource can be stored in video memory for immediate display or elsewhere in memory, for example on a magnetic hard disk. The receiver can obtain the resource from any number of information sources, such as from a server on the Internet, from a broadcast signal, or from a local memory device, such as a hard-disk drive or CD ROM drive.

Next, in step 610, the receiver monitors one or more broadcast channels for valid script triggers directed to the stored information resource. For example, where the information resource is identified by a URL, the receiver monitors broadcast video for script triggers that include a URL matching that of the information resource. A valid script trigger is one that is encoded in a predetermined syntax, such as the syntax described earlier, and whose resource locator and attribute/value pairs are not corrupted, as determined by a comparison of a checksum generated by the receiving device to the checksum accompanying the script trigger. The receiver ignores invalid script triggers.

Upon receipt of a valid script trigger matching the information resource (step 620), the receiver determines whether the resource locator associated with the script trigger matches that of the information resource (decision 630). If not, the receiver disregards the script trigger (step 640) and continues monitoring the broadcast channel. If, on the other hand, the resource locator associated with the script trigger matches that of the receiver, then the information resource executes the script or script fragment within the script trigger (step 650) and continues monitoring the broadcast channel (step 610).

The foregoing receiver methods are embodied in machine-executable instructions, which can be used to cause a general-purpose or special-purpose processor programmed with the instructions to perform the steps. Alternatively, the steps might be performed by specific hardware components that contain hardwired logic for performing the steps, or by any combination of programmed computer components and dedicated hardware.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A receiver for use in a method of enhancing an information resource comprising a Web page used to enhance a video broadcast signal with Internet content, wherein the information resource simultaneously resides in memory on a number of remote receivers, including said receiver, said receiver comprising:

a processor for processing computer-executable instructions stored in memory; and memory having the computer-executable instructions stored thereon, wherein said computer executable instructions implement a method that includes:

storing, in one or more receivers, an information resource identified by a first resource identifier;

presenting a field configured to receive user input related to the information resource;

receiving at the presented field user input including information associated with the information resource, wherein the user input is used to customize the information resource;

monitoring at the one or more receivers a data service channel of a broadcast television signal for a script trigger, wherein the script trigger includes a second resource identifier, a script which contains executable code configured to directly modify at least a portion of the stored information resource based on the received user input, and a portion of updated information sent with the script trigger in response to the received user input that is to be applied to the information resource to customize the information resource, wherein the modifications include one or more changes to the functionality of the information resource and one or more changes to the data contained within the information resource, the changes to the data contained within the information resource being updated using the portion of updated information received with the script trigger, such that information resource data is updateable without linking to another network to request and receive the changes; and thereafter, running the executable code of the script on the one or more receivers to implement the data and functionality changes indicated in the received script trigger, wherein the data and functionality changes alter both a visual representation of the information resource which varies depending on a receiver's interpretation of the resource and upon the other resources referred to by the information resource and the context of the information resource including altering at least one of the information resource's associated HTML tags or scripts, upon receipt of the script trigger, if the second resource identifier matches the first resource identifier of the stored information resource.

2. The receiver of claim 1, wherein the method further comprises displaying the information resource stored in memory.

3. The receiver of claim 1, wherein the information resource comprises tags that define a context of the resource, and wherein the script modifies the context.

4. The receiver of claim 1, wherein the script is a fragment of a second script resident on the information resource.

5. The receiver of claim 1, wherein the method further comprises displaying a video portion of the broadcast signal, wherein the script trigger synchronizes the information resource with the video portion of the broadcast signal.

6. The receiver of claim 1, wherein the broadcast signal comprises video data, and wherein the script trigger induces an enhancement of the information resource.

7. The receiver of claim 1, wherein the first and second resource identifiers are URLs.

8. The receiver of claim 1, further comprising at least two separate television channel tuners used simultaneously, wherein at least one of the television channel tuners is configured to receive a television program on a first channel and wherein at least one of the television channel tuners is configured to monitor a second channel for information resource enhancements and provide the information enhancements to a display for simultaneous display with the television program of the first channel.

9. A receiver for use in a method of enhancing an information resource comprising a Web page used to enhance a video broadcast signal with Internet content, wherein the information resource simultaneously resides in memory on a number of remote receivers, including said receiver, said receiver comprising:
  a processor for processing computer-executable instructions stored in memory; and
  memory having the computer-executable instructions stored thereon, wherein said computer executable instructions implement a method that includes:
    storing, in one or more receivers, an information resource identified by a first resource identifier;
    presenting a field configured to receive user input related to the information resource;
    receiving at the presented field user input including information associated with the information resource, wherein the user input is used to customize the information resource;
    monitoring at the one or more receivers a data service channel of a broadcast television signal for a script trigger, wherein the script trigger includes a second resource identifier, a checksum, a script which contains executable code configured to directly modify at least a portion of the stored information resource based on the received user input, and a portion of updated information sent with the script trigger in response to the received user input that is to be applied to the information resource to customize the information resource, the script's executable code allowing a content creator for the information resource to provide interaction between in information resource and a user, control the remote receivers, and dynamically create HTML content, the modifications including one or more changes to the functionality of the information resource and one or more changes to the data contained within the information resource, the changes to the data contained within the information resource being updated using the portion of updated information received with the script trigger, such that information resource data is updateable without linking to another network to request and receive the changes;
    determines that the script trigger is valid, wherein a valid script trigger is encoded in a predetermined syntax, and includes resource locator and attribute/value pairs that are not corrupted, as determined by a comparison of a checksum generated by the receiver and the checksum received with the script trigger; and
    after determining that the script trigger is valid, running the executable code of the script on the one or more receivers to implement the data and functionality changes indicated in the received script trigger, wherein the data and functionality changes alter both a visual representation of the information resource which varies depending on a receiver's interpretation of the resource and upon the other resources referred to by the information resource and the context of the information resource including altering at least one of the information resource's associated HTML tags or scripts, upon receipt of the script trigger, if the second resource identifier matches the first resource identifier of the stored information resource.

10. The receiver of claim 9, wherein the method further comprises displaying the information resource stored in memory.

11. The receiver of claim 9, wherein the information resource comprises tags that define a context of the resource, and wherein the script modifies the context.

12. The receiver of claim 9, wherein the script is a fragment of a second script resident on the information resource.

13. The receiver of claim 9, wherein the method further comprises displaying a video portion of the broadcast signal, wherein the script trigger synchronizes the information resource with the video portion of the broadcast signal.

14. The receiver of claim 9, wherein the broadcast signal comprises video data, and wherein the script trigger induces an enhancement of the information resource.

15. The receiver of claim 9, wherein the first and second resource identifiers are URLs.

16. A method for enhancing an information resource comprising a Web page used to enhance a video broadcast signal with Internet content, wherein the information resource simultaneously resides in memory on a number of remote receivers, the method comprising:
  storing, in one or more receivers, an information resource identified by a first resource identifier;
  presenting a field configured to receive user input related to the information resource;
  receiving at the presented field user input including information associated with the information resource, wherein the user input is used to customize the information resource;
  monitoring at the one or more receivers a data service channel of a broadcast television signal for a script trigger, wherein the script trigger includes a second resource identifier, a checksum, a script which contains executable code configured to directly modify at least a portion of the stored information resource based on the received user input, and a portion of updated information sent with the script trigger in response to the received user input that is to be applied to the information resource to customize the information resource, the script's executable code allowing a content creator for the information resource to provide interaction between in information resource and a user, control the remote receivers, and dynamically create HTML content, the modifications including one or more changes to the functionality of the information resource and one or more changes to the data contained within the information resource, the changes to the data contained within the information resource being updated using the portion of updated information received with the script trigger, such that information resource data is updateable without linking to another network to request and receive the changes;
  determines that the script trigger is valid, wherein a valid script trigger is encoded in a predetermined syntax, and includes resource locator and attribute/value pairs that are not corrupted, as determined by a comparison of a checksum generated by the receiver and the checksum received with the script trigger; and after determining that the script trigger is valid, running the executable code of the script on the one or more receivers to implement the data and functionality changes indicated in the received script trigger, wherein the data and functionality changes alter both a visual representation of the information resource which varies depending on a receiver's interpretation of the resource and upon the other resources referred to by the information resource and the context of the information resource including altering at least one of the information resource's associated HTML tags or scripts, upon receipt of the script trigger, if the second resource identifier matches the first resource identifier of the stored information resource.

17. The receiver of claim 16, wherein the method further comprises displaying the information resource stored in memory.

18. The receiver of claim 16, wherein the information resource comprises tags that define a context of the resource, and wherein the script modifies the context.

19. The receiver of claim 16, wherein the script is a fragment of a second script resident on the information resource.

20. The receiver of claim 16, wherein the method further comprises displaying a video portion of the broadcast signal, wherein the script trigger synchronizes the information resource with the video portion of the broadcast signal.

* * * * *